(12) United States Patent
Jiang et al.

(10) Patent No.: US 9,357,503 B2
(45) Date of Patent: May 31, 2016

(54) METHODS AND APPARATUSES FOR DETERMINING TRANSMISSION POWER AND PROVIDING INFORMATION FOR POWER DETERMINATION

(71) Applicant: NEC (CHINA) CO., LTD., Beijing (CN)

(72) Inventors: Lei Jiang, Beijing (CN); Gang Wang, Beijing (CN); Zhennian Sun, Beijing (CN); Ming Lei, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 0 days.

(21) Appl. No.: 14/384,319

(22) PCT Filed: Sep. 25, 2012

(86) PCT No.: PCT/CN2012/081906
§ 371 (c)(1),
(2) Date: Sep. 10, 2014

(87) PCT Pub. No.: WO2014/047775
PCT Pub. Date: Apr. 3, 2014

(65) Prior Publication Data
US 2015/0195791 A1   Jul. 9, 2015

(51) Int. Cl.
*H04W 52/24* (2009.01)
*H04W 72/04* (2009.01)
*H04W 24/02* (2009.01)
*H04W 52/14* (2009.01)

(52) U.S. Cl.
CPC ............ *H04W 52/243* (2013.01); *H04W 24/02* (2013.01); *H04W 52/143* (2013.01); *H04W 72/044* (2013.01)

(58) Field of Classification Search
CPC .. H04W 52/243; H04W 72/044; H04W 52/18
USPC ............ 455/522, 69, 63.1, 67.11, 67.13, 126, 455/127.1, 452.1, 452.2, 509; 370/335, 370/320, 342
See application file for complete search history.

(56) References Cited

U.S. PATENT DOCUMENTS

| 2002/0114289 A1* | 8/2002 | Ishikawa | H04J 13/16 370/320 |
|---|---|---|---|
| 2009/0197538 A1* | 8/2009 | Borran | H04W 52/243 455/63.1 |

(Continued)

FOREIGN PATENT DOCUMENTS

| JP | 06140976 A | 5/1994 |
|---|---|---|
| JP | 2001358651 A | 12/2001 |

OTHER PUBLICATIONS

Communication dated Oct. 20, 2015 from the Japanese Patent Office issued in corresponding Japanese application No. 2015-511895.

*Primary Examiner* — John J Lee
(74) *Attorney, Agent, or Firm* — Sughrue Mion, PLLC

(57) ABSTRACT

The present disclosure provides a method and an apparatus for determining transmission power for a base station. The method may comprise receiving information on link resource configuration of at least one interfered base station; determining the transmission power for the base station, based on link resource configuration for the base station and the information on link resource configuration of the at least one interfered base station. With embodiments of the present invention, it is possible to provide a new power control scheme by which the cross-subframe co-channel interference might be mitigated and thus the uplink performance of a user equipment, and besides, the downlink performance of the edge UE might also be improved. Additionally, the present disclosure also provides a method and apparatus for providing information for power determination.

24 Claims, 5 Drawing Sheets

(56) References Cited

U.S. PATENT DOCUMENTS

2013/0095747 A1* 4/2013 Moshfeghi ............ H04W 88/06 455/7

2014/0219095 A1* 8/2014 Lim .................... H04W 72/085 370/235

* cited by examiner

| Interferred BS 1: | 0 | 0 | 1 | 0 | 0 |
| Interferred BS 2: | 1 | 1 | 0 | 0 | 0 |
| Interferred BS 3: | 1 | 0 | 0 | 0 | 0 |
| Interferred BS 4: | 0 | 0 | 0 | 0 | 0 |
| Interferred BS 5: | 1 | 1 | 1 | 1 | 0 |
| Interferred BS 6: | 1 | 1 | 1 | 1 | 1 |
| Interferred BS 7: | 1 | 1 | 1 | 1 | 1 |
| Adjustment Indicator | 5 | 4 | 4 | 3 | 2 |

FIG. 4B

| Interferred BS 1: | 0 | 0 | 1 | 0 | 0 |
| Interferred BS 2: | 1 | 1 | 0 | 0 | 0 |
| Interferred BS 3: | 1 | 0 | 0 | 0 | 0 |
| Interferred BS 4: | 0 | 0 | 0 | 0 | 0 |
| Interferred BS 5: | 0 | 0 | 0 | 0 | 0 |
| Interferred BS 6: | 1 | 1 | 1 | 1 | 1 |
| Interferred BS 7: | 1 | 1 | 1 | 1 | 1 |
| Adjustment Indicator | 4 | 3 | 3 | 2 | 2 |

FIG. 4C

METHODS AND APPARATUSES FOR DETERMINING TRANSMISSION POWER AND PROVIDING INFORMATION FOR POWER DETERMINATION

CROSS REFERENCE TO RELATED APPLICATIONS

This is a National Stage of International Application No. PCT/CN2012/081906 filed Sep. 25, 2012, the contents of which are incorporated herein by reference in its entirety.

FIELD OF THE INVENTION

Embodiments of the present disclosure generally relate to a field of wireless communication technology, and more particularly, to a method and an apparatus for determining transmission power for a base station and a method and apparatus for providing information for power determination.

BACKGROUND OF THE INVENTION

With the fast development of the wireless communication data service, requirements on data rate and the coverage quality are constantly increasing. In the 3rd Generation Partnership Project (3GPP) long-term evolution advanced (LTE-A), there are proposed Heterogeneous Network (HetNet) technologies to improve the network performance. In a HetNet, there are deployed, for example, a Marcocell, a RRH and s small-type base station node operating at a low power, such as picocell, femtocell, relay, and etc. With the small-type base station node, a distance between an end user and a base station is shorten greatly and quality of receive signals can be enhanced, and furthermore, the transmission rate, the spectrum efficiency and the coverage for cell edge users can also be improved.

However, the use of a plurality of base stations might introduce some problems, especially interferences. For example, the Marcocell will interfere with the small-type base station such as the picocell, femtocell, or relay when it transmits signals, and vice visa; a User Equipment (UE) might also interfere with other UEs when it transmits signals to a base station.

Additionally, in the Time Division LTE (TD-LTE) system, there has been advantageously proposed an asymmetrical uplink (UL) and downlink (DL) resource configuration scheme as so to adapt to the asymmetrical UL and DL data traffic. In the scheme, there is provided seven different UL-DL configurations which are schematically illustrated in FIG. 1.

As illustrated in FIG. 1, a Time Division Duplex (TDD) radio frame consists of ten subframes labeled with #0 to #9. Each of the subframes may be used for DL or UL, or used as a special subframe between the DL period and the UL period. Taking configuration 0 as an example, subframes #0 and #5 are used for the DL transmission, subframes #2 to #4 and subframes #7 to #9 are used for the UL transmission, and subframes #1 and #6 are used as special subframes, which are labeled as "D", "U" and "S" respectively.

Such an asymmetrical resource configuration scheme provides different DL-UL configuration patterns from which the base station can select a suitable configuration based on the UL data size and the DL data size. Therefore, the resource configuration scheme could improve the resource utilization rate. However, since different cells might use different UL-DL configurations, some cells might transmit signals at a point of time when other cells receive signals. Thus, it might also result in cross-subframe co-channel interference (CCI). Taking a scenario of two cells (cell 0 and cell 1) as an example, in which cell 0 uses configuration 0 and cell 1 uses configuration 1. Cell 1 might interfere with cell 0 greatly because, in subframes #4 and #9 which are designated for UL transmission for cell 0 and for DL transmission for cell 1 respectively, cell 0 will receive signals being transmitted by cell 1 at a high power. Therefore, the UL performance might be degraded considerably.

In paper R1-122317, entitled "Performance Evaluation for LTE TDD eIMTA in Multi-cell Scenario", 3GPP TSG RAN WG1 Meeting #69, May, 2012, there is proposed an interference mitigation scheme for a multi-cell scenario. According to the disclosed solution, a Macro eNB (MeNB) will be initially fixed its UL-DL configuration as configuration 1 and No DL-UL reconfiguration will be made. Pico eNB will choose a suitable UL-DL configuration from the seven UL-DL configurations 0 to 6 based on its own traffic condition, for example, a ratio of remaining data in DL buffer and UL buffer. In selection of the UL-DL configuration for the pico eNB, it should avoid the case in which a communication direction of the MeNB is DL and a communication direction of the pico eNB is UL at the same point of time because the subframe used for macro cell's DL transmission is very hard to be used for the purpose of pico cell's UL transmission due to a high interference level. In a case that configuration 0 is fixed as the UL-DL configuration of the MeNB, the pico eNB can only choose its UL-DL configuration from configurations 1, 2, 4 and 5 to avoid BS-BS interference from the MeNB, in view of the fact that subframe 4 in configuration 0 is used for the DL transmission by the MeNB while subframe 4 for each of configurations 0, 3 and 6 is designated for the UL transmission.

In the disclosed solution, an interference mitigation scheme can be performed wherein the pico eNB will adjust its DL transmission power when it transmits DL signal in a subframe defined as UL in the initial UL-DL configuration. Specifically, the DL transmission power is determined based on a path loss to the neighboring cells such that the interference caused by the pico eNB's DL transmission is no higher than predetermined target interference over thermal (IoT) level in UL reception at the eNB which is the closest to the pico eNB.

However, the interference mitigation scheme might have a low resource utilization rate or might not mitigate the interference efficiently. For example, it can not mitigate the interference with the MeNB initially caused by a pico eNB; or when there are more than one comparable neighboring eNBs which are the closest to the pico eNB, either the resource utilization rate is low or the interference can not be mitigated efficiently.

Therefore, there is a need for a new technical solution for the interference mitigation in the art.

SUMMARY OF THE INVENTION

In view of the foregoing, the present disclosure provides a new solution for power control so as to solve or at least partially mitigate at least a part of problems in the prior art.

According to a first aspect of the present invention, there is provided a method for determining transmission power for a base station. The method may comprise: receiving information on link resource configuration of at least one interfered base station; and determining the transmission power for the base station, based on link resource configuration for the base station and the information on link resource configuration of the at least one interfered base station.

In an embodiment of the present invention, the information on link resource configuration may be related to at least part of subframes in a TDD radio frame, which can be used for uplink transmission or downlink transmission in different link resource configurations.

In another embodiment of the present invention, the information on link resource configuration further may comprise uplink resource utilization condition of the at least interfered base station.

In a further embodiment of the present invention, the information on link resource configuration may be indicated by a bit map representing the link resource configuration of the at least one interfered base station.

In a still further embodiment of the present invention, the determining the transmission power for the base station may comprise determining, from the information on link resource configuration, an adjustment indicator reflecting a possibly caused interference condition under the link resource configuration; and setting the transmission power for the base station based on the adjustment indicator.

In a yet further embodiment of the present invention, the adjustment indicator may be related to the number of respective subframes in link resource configuration of the at least one interfered base station, which are used by the at least one interfered base station for uplink transmission but, in the link resource configuration for the base station, are used for downlink transmission.

In another further embodiment of the present invention, the setting the transmission power for the base station based on the adjustment indicator may comprise setting the transmission power as a value corresponding to a range to which the adjustment indicator belongs.

In a further embodiment of the present invention, the determining the transmission power for the base station may be re-performed in response to reception of a power redetermination request comprising information on new uplink resource utilization condition of the at least interfered base station.

According to a second aspect of the present invention, there is provided a method for providing, at a base station, information for transmission power determination. The method may comprise obtaining information on link resource configuration of the base station; and transmitting the information on link resource configuration to at least one interfering base station for using in transmission power determination.

In an embodiment of the present invention, the information on link resource configuration may be related to at least part of subframes in a TDD radio frame which can be used for uplink transmission or downlink transmission in different link resource configurations.

In another embodiment of the present invention, the information on link resource configuration may further comprise link resource utilization condition of the base station.

In a further embodiment of the present invention, the method may further comprise transmitting to the interfering base station a power redetermination request comprising information on new uplink resource utilization condition of the base station.

According to a third aspect of the present invention, there is provided an apparatus for determining a transmission power for a base station. The apparatus may comprising: a configuration information receiving module configured to receive information on link resource configuration of at least one interfered base station; and a transmission power determination model configured to determine the transmission power for the base station, based on link resource configuration for the base station and the information on link resource configuration of the at least one interfered base station.

According to a fourth aspect of the present invention, there is provided an apparatus for providing, at a base station, information for transmission power determination. The method may comprise a configuration information obtainment module configured to obtain information on link resource configuration of the base station; and a configuration information transmission module configured to transmit the information on link resource configuration to at least one interfering base station for using in transmission power determination.

According to a fifth aspect of the present invention, there is provided a computer-readable storage media with computer program code embodied thereon, the computer program code configured to, when executed, cause an apparatus to perform actions in the method according to any one of embodiments of the first aspect.

According to a sixth aspect of the present invention, there is provided a computer-readable storage media with computer program code embodied thereon, the computer program code configured to, when executed, cause an apparatus to perform actions in the method according to any one of embodiments of the second aspect.

In a seventh aspect of the present invention, there is provided a computer program product comprising a computer-readable storage media according to the fifth aspect.

In a eighth aspect of the present invention, there is provided a computer program product comprising a computer-readable storage media according to the sixth aspect.

With embodiments of the present invention, it may provide a new power control scheme by which the CCI might be mitigated and thus the uplink performance of a user equipment might be improved and at the same time, the downlink performance of the edge UE might be also improved. Moreover, with the embodiments of the present invention, respective base stations could reconfigure their respective UL-DL resource according to their own traffic conditions and thus the transmission resource can be used at a high efficiency.

BRIEF DESCRIPTION OF THE DRAWINGS

The above and other features of the present invention will become more apparent through detailed explanation on the embodiments as illustrated in the embodiments with reference to the accompanying drawings throughout which like reference numbers represent same or similar components and wherein:

FIG. 4A to 4D schematically illustrates an example operations of a transmission power determination according to an embodiment of the present invention;

DETAILED DESCRIPTION OF EMBODIMENTS

Hereinafter, a method and apparatus for determining transmission power for a base station and a method and apparatus for providing information for transmission power determination will be described in details through embodiments with reference to the accompanying drawings. It should be appreciated that these embodiments are presented only to enable those skilled in the art to better understand and implement the present invention, not intended to limit the scope of the present invention in any manner.

It should be first noted that this invention is illustrated in particular sequences for performing the steps of the methods. However, these methods are not necessarily performed strictly according to the illustrated sequences, and they can be performed in reverse sequence or simultaneously based on natures of respective method steps. Beside, the indefinite article "a/an" as used herein does not exclude a plurality of such steps, units, devices, and objects, and etc.

Figures 1, 2:
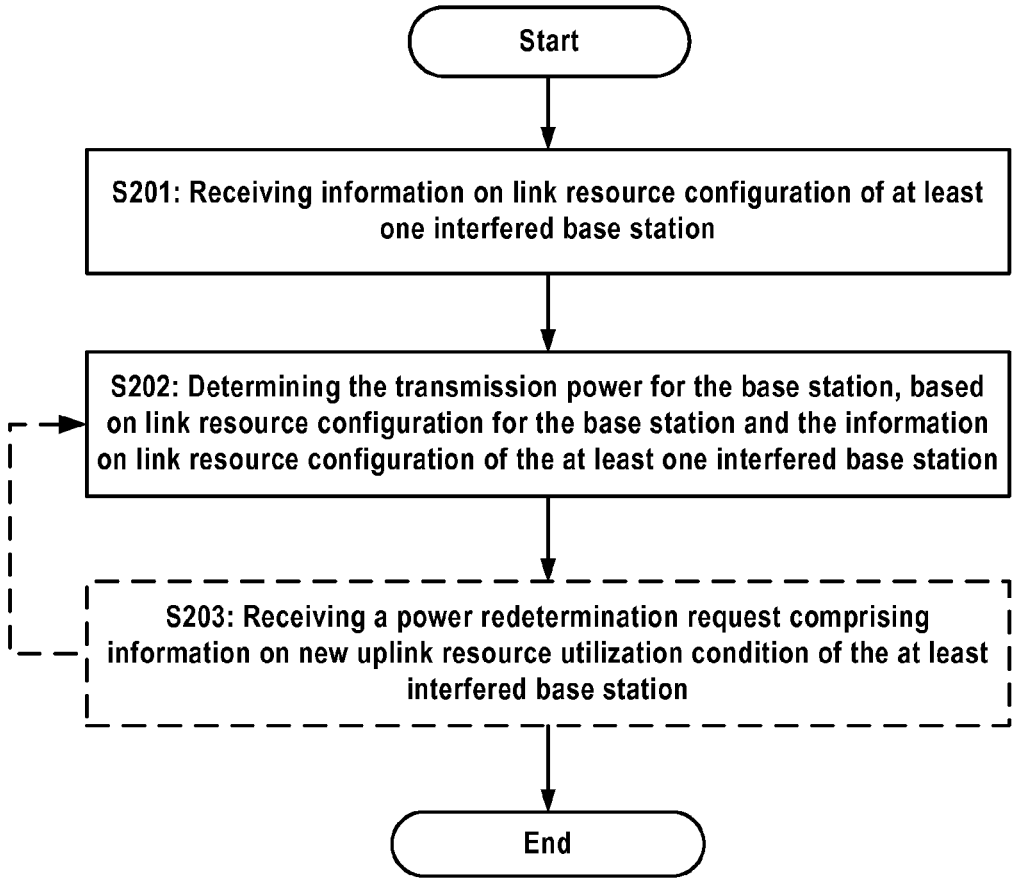
FIG. 1 schematically illustrates a diagram of UL-DL configurations specified by 3GPP.
FIG. 2 schematically illustrates a flow chart of a method for determining transmission power for a base station according to an embodiment of the present invention.
Figure 3:
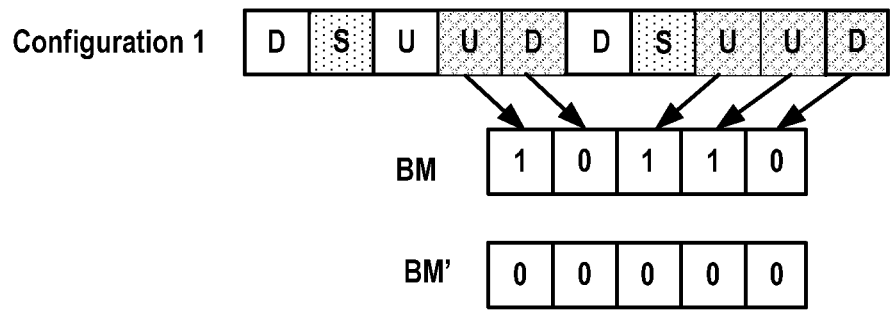
FIG. 3 schematically illustrates a bitmap representing the link resource configuration of a base station according to an embodiment of the present invention.

First, FIGS. 2 to 4 will be referenced to describe a method for determining transmission power for a base station as provided in the present invention.

As illustrated in FIG. 2, first at step S201, information on the link resource configuration of at least one interfered base station is received by the base station.

In embodiments of the present invention, the information on the link resource configuration may be transmitted to the base station by the at least one interfered base station. An interfered base station used herein is one that might be subject to interference caused by the base station (referred to as target base station hereinafter) for which the transmission power will be determined.

The interfered base station can be determined in any suitable manner. For example, in an embodiment of the present invention, it can be determined based on the geometrical geography information, which can be obtained at the beginning of the network configuration. Particularly, a base station located within a predetermined distance from the target base station can be identified as an interfered base station. In another embodiment of the present invention, the interfered base station can be determined based on a path loss or coupling loss which can be measured by performing additional measurements. As an example, a base station can be determined as an interfered base station if a path loss or coupling loss between this base station and the target base station is lower than a predetermined threshold.

Additionally, the number of the interfered base station can be also limited. For example, the number N of the interfered base station can be set in advance, and the N base stations which are closest to the target base station, or which have the lowest path loss or coupling loss can be identified as interfered base stations of the target base station. Or alternatively, the maximum number N of the interfered base station can be predetermined, that is to say, at most N base stations which are located within a predetermined location range or satisfy the predetermined threshold can be determined as interfered base stations.

The information on the link resource configuration can be collected by the interfered base station, for example, when a resource configuration or re-configuration is performed. A base station will periodically configure its link resource, i.e., select its UL-DL configuration from the seven configurations based on the data size in DL and UL buffer. When a configuration is selected, the information thereon can be transmitted to the target base station for using in transmission power determination. Or alternatively, the information can be transmitted when the configuration number is changed.

The information on the link resource configuration for example can comprise the number of configuration which is selected by the interfered base station based on its own traffic condition. For the seven configurations as illustrated in FIG. 1, 3 bits are enough.

However, in an embodiment of the present invention, the information on link resource configuration is related to only part of subframes in a TDD radio frame. The part of subframes are those that can be used for uplink transmission or downlink transmission in different link resource configurations. To explain it in more details, reference will be made back to FIG. 1. From FIG. 1, it can be seen that each of subframes #0, #1, #2 and #5 is used for a similar transmission purpose in different configurations; specifically subframe #0 is used for DL transmission, subframe #1 is used as a special subframe, subframe #2 is used for UL transmission, and subframe #5 is used for DL transmission. Additionally, although subframe #6 can be used as a special subframe or for DL transmission, most of the special subframe is used for DL transmission, which can also be regarded as a special DL transmission. Since each of these subframe is used for a same transmission purpose, thus, it will not introduce any CCI. Accordingly, the information about them is not necessary and only those that can be used for uplink transmission or downlink transmission in different link resource configurations are indispensable.

In an embodiment of the present invention, the information on the link resource configuration can comprise a bit map which reflect the UL-DL configuration of the at least one interfered base station. That is to say, the information can be represented by a bit map. The bit map can comprise information about all the subframes, but it is preferable that it comprises only the above-mentioned part of subframes, i.e., those that can be used for uplink transmission or downlink transmission in different link resource configurations.

FIG. 3 schematically illustrates an example of a bitmap representing the link resource configuration of a base station according to an embodiment of the present invention. In this figure, configuration 1 is illustrated as an example and only those necessary subframes are considered, which are illustrated by the background with cross lines. In the embodiment of the present invention, if a subframe is used for UL transmission, a corresponding bit in the bit map will have a value of "1", otherwise a value of "0" will be designated to the bit. As illustrated, among subframes #3, #4, and #7 to #9, subframes #3, #7 and #8 are used for UL transmission while subframes #4, #9 is used for DL transmission, and thus the corresponding bitmap is "10110" as illustrated by "BM".

Additionally, the information on link resource configuration may further comprise uplink resource utilization condition of the at least interfered base station. The uplink resource utilization condition refers to a condition whether frames designated for UL transmission are used or not, or in other word whether any UL data is needed to be transmitted by the interfered base station. If the interfered base station has no UL traffic, the DL transmission by other base station will not introduce CCI thereto. Therefore, the uplink resource utilization condition is useful information for power control.

The uplink resource utilization condition can also be indicated in the bit map. In an embodiment of the present invention, if there is no UL data to be transmitted, the corresponding bit in bitmap can have a value of "0" instead of "1". For example, as far as configuration 1 as illustrated in FIG. 3 is concerned, the bit map will be "00000" if the interfered base station has no UL traffic, as illustrated by "BM'". In the case that the bit map is all zero, the transmission of the bit map can be omitted to save transmission resource.

In a case that the information on link resource configuration is indicated by a configuration number which may be represented by, for example, three bits, a further bit may be used to indicate the uplink resource utilization condition of the at least interfered base station. For example, "0" denotes that there is no UL traffic, "1" denotes that there is UL traffic or vice visa. Or alternatively, it is possible not to transmit the information on link resource configuration if the interfered base station has no UL traffic.

Then at step S202, the transmission power for the base station is determined based on the information on link resource configuration for the target base station and the information on link resource configuration of the at least one interfered base station.

The information on link resource configuration for the target base station can provide the UL-DL configuration of the target base station. In view of the fact that the BS-BS CCI will be introduced to other base stations only when the target base station is transmitting data, it can only focus on subframes designated for DL transmission by the target base station in power control. Therefore, if the target base station chooses configuration 0, no power control is required because each of subframes #3, #4, #7 to #9 is used for UL transmission.

Additionally, from the information on link resource configuration of the at least one interfered base station, it can learn UL-DL configuration of the interfered base station, especially subframes designated for UL transmission.

Therefore, based on the above information, it can identify the case in which a communication direction of the target base station is DL while a communication direction of the interfered base station is UL at a same point of time. If the case occurs, it is required to reduce the power of the target base station in the corresponding subframe. For example, if the information on link resource configuration for the target base station shows that a certain subframe is used to transmit DL data, but the information on link resource configuration of the at least one interfered base station shows that the subframe is used to transmit UL data, then the transmission power of the target base station at the subframe should be reduced to, for example, zero power.

In another embodiment of the present invention, an adjustment indicator, which reflects a possibly caused interference condition under the link resource configuration, is first determined from the information on link resource configuration, and then the transmission power is determined based on the adjustment indicator. Hereinafter, the particular operations will be described with reference to an example scenario which is illustrated in FIGS. 4A to 4D.

Figure 4A:
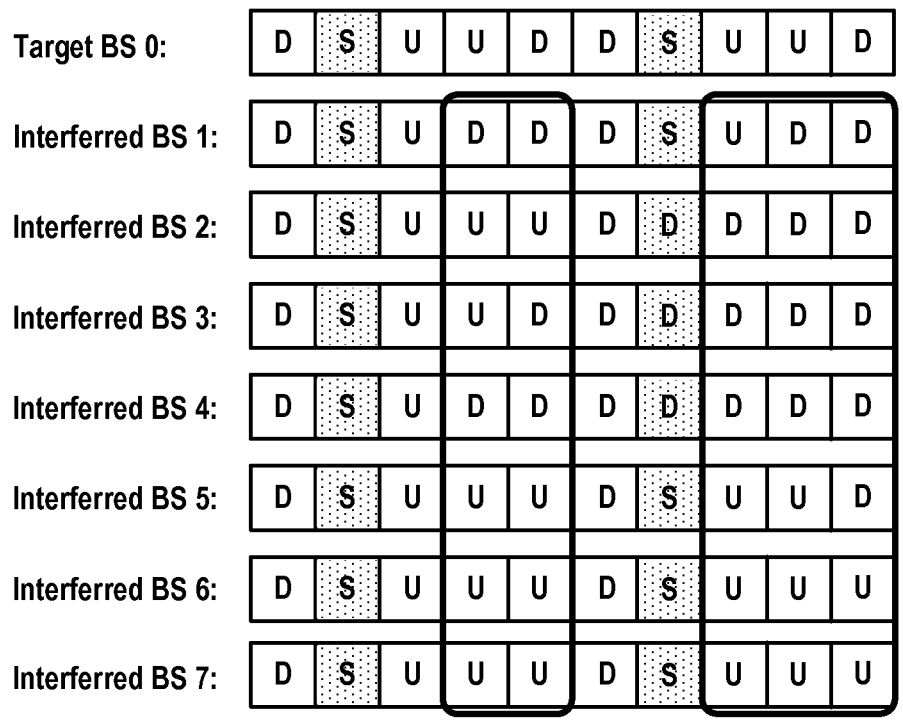

As illustrated in FIG. 4A, the target base station BS 0 has, for example, seven interfered base stations BS 1 to BS 7. In this example scenario, configuration 1 is selected for using by BS 0; configuration 2 is selected for using by BS 1; configuration 3 is selected for using by BS 2; configuration 4 is selected for using by BS 3; configuration 5 is selected for using by BS 4; configuration 6 is selected for using by BS 5; configuration 0 is selected for using by both BS 6 and BS 7. Therefore, the target base station BS 0 will receive bit maps from its seven interfered base stations BS 1 to BS 7. The example bitmaps are illustrated in FIG. 4B, in which only part of subframes, i.e., subframes #3, #4, #7, #8 and #9 are concerned. However, as described hereinabove, an "all zero" bit map is not required to transmit and thus BS 4 need not transmit its bit map to BS 0.

The adjustment indicator, based on which the power control can be performed, can be related to the number of respective subframes in UL-DL configuration of the interfered base stations, which are used by the interfered base stations for UL transmission but are used by the target base station for downlink transmission. As an example, the adjustment indicators for respective subframes can be obtained by, for example, adding respective bits in the bit maps together. Taking the illustrated scenario as an example, a bitmap representing the adjustment indicators as shown in bottom of FIG. 4B can be obtained, i.e., "54432". However, the present invention is not limited thereto and the indicator can be obtained by any other manners. For example, in another embodiment of the present invention, the adjustment indicators can be represented by weighted sum of the bit maps, for example weighted by the path loss.

In view of the fact that the target base station BS 0 selects configuration 1 for transmission, only suframes #4 and #9 are required to be considered because only the two subframes, which are designed for UL transmission, might introduce the CCIs to other base stations. Giving that there is only one adjustment threshold (N/2, i.e., 3.5) and two levels of transmission power (i.e., a full power and zero power) are used. Regarding subframe #4, since the adjustment indicator (i.e., the corresponding bit in the sum bit map) has a value of 4 (illustrated by a black block), which is higher than the adjustment threshold of 3.5, the transmission power is required to reduce to mitigate the CCI, for example, the power can be set as zero power. Similarly, regarding subframe #9, the transmission power can be set as full power because the value of the corresponding bit is lower than the adjustment threshold.

Additionally, the uplink resource utilization condition can be taken into account. As an example, if BS 5 has no UL traffic, its corresponding bit map will be "00000" instead of "11110", which is illustrated by a black block in FIG. 4C. In such a case, the sum bit map for adjustment indicators will be "43322". It is clear that the two bit values in the bitmap corresponding to subframes #4 and #9 are both lower than the predetermined threshold of 3.5. Therefore, it is not needed for BS 0 to reduce the transmission power in subframes #4 and #9 and their transmission power can be determined as full power.

Figure 4D:
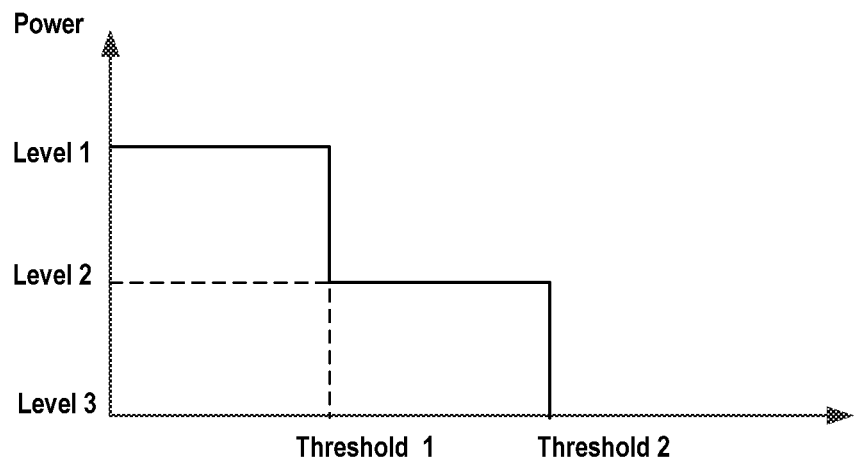

In another embodiment of the present invention, it may adopt a multi-level power adjustment scheme, for example two-level adjustment which is illustrated as an example in FIG. 4D. In such a case, the transmission power can be set as a value corresponding to a range to which the adjustment indicator belongs. Taking the illustrated two-level adjustment for an example, if the adjustment indicator is fallen within a first range (lower than threshold 1), the transmission power can be set as level 1 (full power for example); if the adjustment indicator belongs to a second range (higher than threshold 1 but lower than threshold 2), the transmission power can be set as level 2 (half power, for example); if the adjustment indicator belongs to a third range (higher than threshold 2), the transmission power can be set as level 3 (for example, zero power). For operations about more than two levels adjustment, the skilled in the art can readily achieve the operations upon reading the teaching provided herein, which will not be elaborated herein for a purpose of simplicity.

It should be appreciated that, in addition to the above-mentioned transmission power adjustment in a discrete manner, it is also possible to adjust the transmission power continuously (if applicable).

Additionally, if a power redetermination request is received at step S203, it can also re-determine the transmission power for the target base station. It is known that the UL-DL configuration or reconfiguration is performed periodically. However, before a reconfiguration is done, the traffic condition, especially the UL traffic condition might have been changed. In an embodiment of the present invention, if the UL traffic condition has changed, a power redetermination request can be transmitted to the target base station so that the target base station can re-determine the transmission power based on the new traffic condition.

The power redetermination request may be a separate message comprising information on new uplink resource utilization condition of the interfered base station. In addition, similar to the uplink resource utilization condition described hereinabove, the new uplink resource utilization condition may be represented by one bit wherein "1" denotes UL traffic, and "0" denotes no UL traffic.

Additionally, the power redetermination request may also be in a similar form to information on the link resource configuration. In other word, the information on the resource configuration comprising information on the uplink utilization condition can be re-transmitted as the power redetermination request to the target base station when the uplink utilization condition changes, but it is the new uplink resource utilization condition that is contained in the information on the resource configuration. In response to reception of such a power redetermination request, the target base station can re-determine the transmission power to adapt the new condition.

With embodiments of the present invention, it may provide a new power control scheme by which the cross-subframe co-channel interference will be mitigated. Therefore, the uplink performance of UE will be improved. Moreover, according the embodiments, the power is reduced only when a subframe is used by other base station for UL traffic, and thus it is not required to reduce power when a subframe is used by the target base station and the interfered base station for DL transmission or when there is no UL traffic in interfered base station, thus, the downlink performance of the edge UE might be also improved. Besides, with the embodiments of the present invention, each base station could freely reconfigure their respective UL-DL resources according to their own traffic condition and thus the transmission resource can be used at a high efficiency.

Additionally, there is also provided a method for providing, at a base station, information for transmission power determination, which will be described with reference to FIG. 5.

Figure 5:
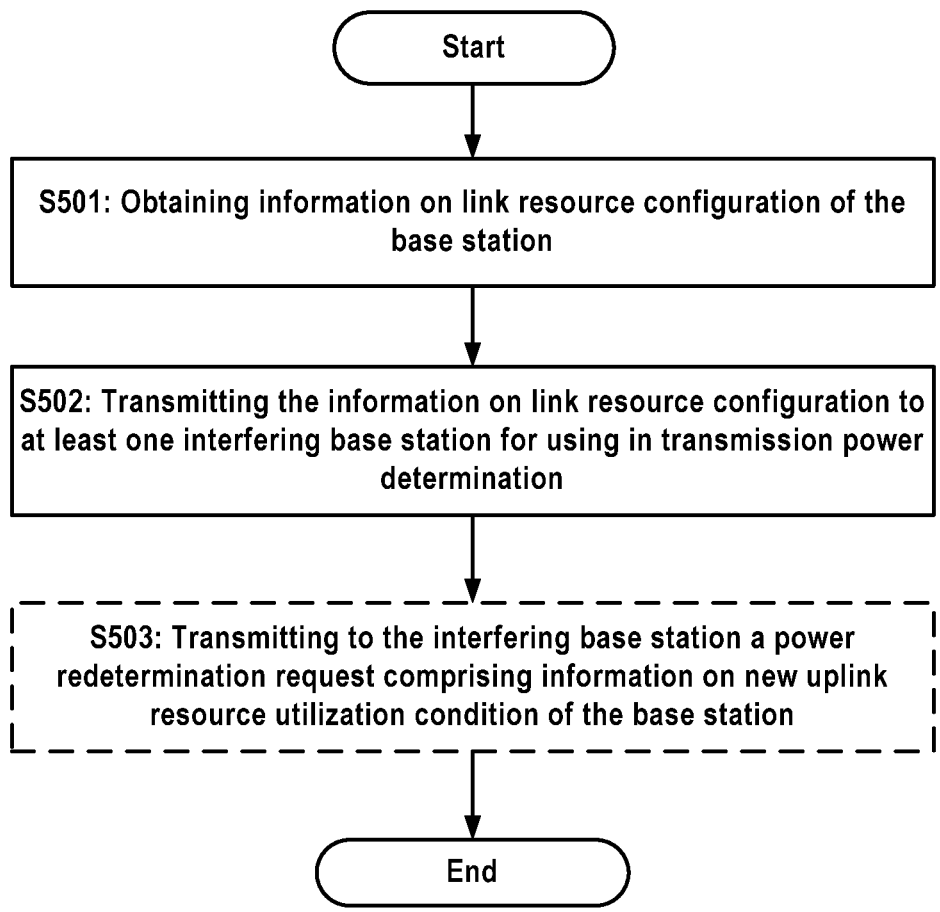
FIG. 5 schematically illustrates a flow chart of a method for providing information for transmission power determination at a base station according to an embodiment of the present invention.

As illustrated in FIG. 5, at Step S501, information on link resource configuration of the base station is obtained. The information on the link resource configuration can be collected by the base station, for example, when a resource configuration or re-configuration is performed. As described above, the base station will periodically select its UL-DL configuration from the seven configurations based on its own traffic condition. For example, it can be performed based on the UL data buffer size and the DL data buffer size, amount of UL and DL data, UL transmitting capacity and DL transmitting capacity, data arrival rate, and etc. When a configuration is selected, the information thereon can be transmitted to the target base station for using in transmission power determination. Or alternatively, the information can be transmitted when the configuration has been changed.

The information on link resource configuration of the base station can comprise a bit map that represents the link resource configuration. In an embodiment of the present invention, no information will be transmitted to the interfering base station if the bitmap is all zero so as to save transmission resource.

Or alternatively, the information on the link resource configuration for example can comprise the number of configuration which is selected by the interfered base station based on its own traffic condition.

Besides, the information on link resource configuration can also be related to only part of subframes in a TDD radio frame. The part of subframes are those that can be used for uplink transmission or downlink transmission in different link resource configurations.

Preferably, the information on link resource configuration can further comprise link resource utilization condition of the base station to avoid unnecessary power reduction as much as possible.

Then, at step S502, the information on link resource configuration is transmitted to at least one interfering base station for using in transmission power determination.

As described hereinabove, the interfering base station can be determined based on the geometrical geography information, or based on the path loss or coupling loss. The obtained information can be transmitted to its interfering base stations via any suitable signaling, such that the interfering base stations can perform power control based on the information, so as to mitigate the CCI that might be introduced.

Additionally, when the link resource utilization condition changes, a power redetermination request can be transmitted to the interfering base station (S503). The request can be in a form of a separate message or in a similar form to the information on the link resource configuration, as have been described hereinabove.

In the present invention, there is also provided an apparatus for determining transmission power for a base station which will be described with reference to FIG. 6.

Figure 6:
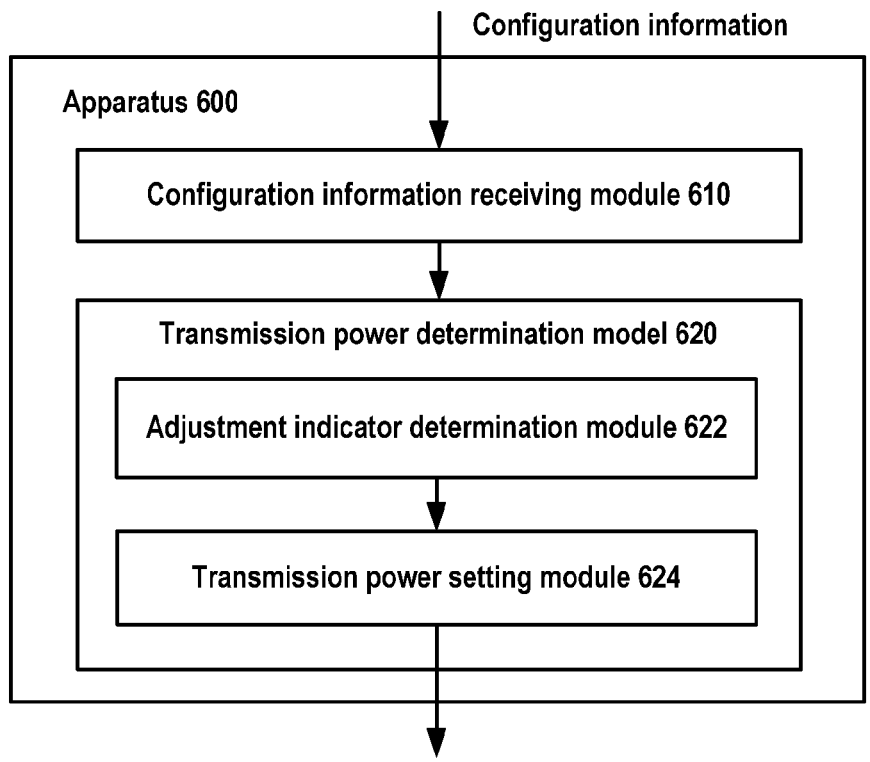
FIG. 6 schematically illustrates a block diagram of an apparatus for determining transmission power for a base station according to an embodiment of the present invention.

As illustrated in FIG. 6, apparatus 600 may comprise a configuration information receiving module 610, and a transmission power determination model 620. The configuration information receiving module 610 may be configured to receive information on link resource configuration of at least one interfered base station. The transmission power determination model 620 may be configured to determine the transmission power for the base station, based on link resource configuration for the base station and the information on link resource configuration of the at least one interfered base station.

In an embodiment of the present invention, the information on link resource configuration may be related to at least part of subframes in a TDD radio frame which can be used for uplink transmission or downlink transmission in different link resource configurations.

In another embodiment of the present invention, the information on link resource configuration can further comprise uplink resource utilization condition of the at least interfered base station.

In a further embodiment of the present invention, the information on link resource configuration may be indicated by a bit map representing the link resource configuration of the at least one interfered base station.

In a still further embodiment of the present invention, the transmission power determination model 620 may further comprise an adjustment indicator determination module 622 and a transmission power setting module 624. The adjustment indicator determination module 622 may be configured to determine, from the information on link resource configuration, an adjustment indicator reflecting a possibly caused interference condition under the link resource configuration. The transmission power setting module 624 may be configured to set the transmission power for the base station based on the adjustment indicator.

In a yet further embodiment of the present invention, the adjustment indicator may be related to the number of respective subframes in link resource configuration of the at least one interfered base station which are used by the at least one interfered base station for uplink transmission but, in the link resource configuration for the base station, are used for downlink transmission.

In a still yet further embodiment of the present invention, the transmission power setting module 624 may be further configured to set the transmission power as a value corresponding to a range to which the adjustment indicator belongs.

In another embodiment of the present invention, the transmission power determination mode 620 is configured to re-determine the transmission power in response to reception of a power redetermination request comprising information on new uplink resource utilization condition of the at least interfered base station.

Figure 7:
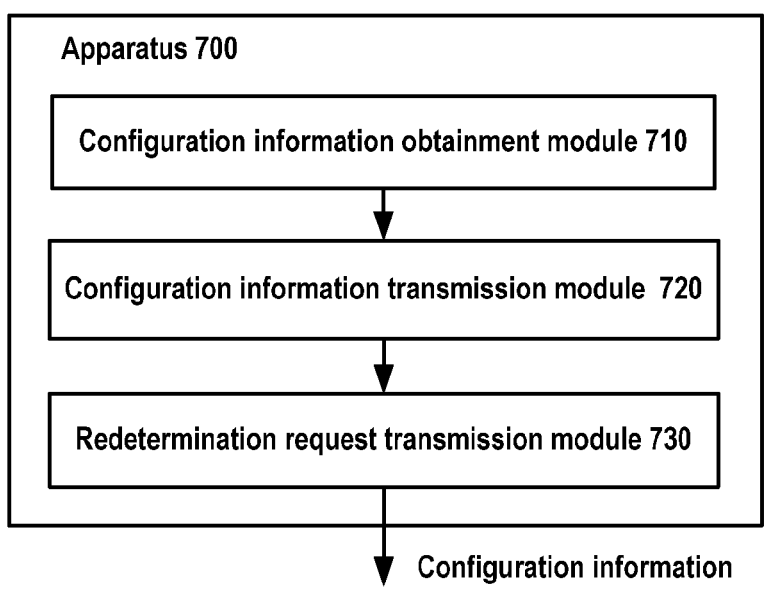
FIG. 7 schematically illustrates a block diagram of an apparatus for providing information for transmission power determination at a base station according to an embodiment of the present invention.

Beside, the present invention further provides an apparatus for provide information, at a base station for power determination. Next, reference will made to FIG. 7 to describe for provide information, at a base station for power determination As illustrated in FIG. 7, apparatus 700 may comprise a configuration information obtainment module 710 and a configuration information transmission module 720. The configuration information obtainment module 710 may be configured to obtain information on link resource configuration of the base station. The configuration information transmission module 720 may be configured to transmit the information on link resource configuration to at least one interfering base station for using in transmission power determination.

In an embodiment of the present invention, the information on link resource configuration may be related to at least part of subframes in a TDD radio frame, which can be used for uplink transmission or downlink transmission in different link resource configurations.

In another embodiment of the present invention, the information on link resource configuration may further comprise link resource utilization condition of the base station.

In a further embodiment of the present invention, apparatus 700 may further comprise a redetermination request transmission module 730. The redetermination request transmission module 730 may be configured to transmit to the interfering base station a power redetermination request comprising information on new uplink resource utilization condition of the base station.

Additionally, the inventors have carried out simulations on the prior art and the technical solution as provided in the present invention. In these simulations, the following assumptions for parameters are used.

TABLE 1

| Parameter Assumptions | |
| --- | --- |
| Parameter | Assumptions |
| Deployment scenario | 7Macro*3sector, 4 picos per sector (Macro is not active) |
| Number of UEs per Pico cell | 10 UEs uniformly dropped around each of the Pico cells within a radius of 40 m |
| Carrier frequency | 2 GHz |
| System bandwidth | 10 MHz |
| UL antenna configuration | 1Tx, 2Rx |
| DL antenna configuration | 1Tx 2Rx |
| Traffic model | Same traffic generation methodology and arriving rate as agreed in isolated cell case [R1-120080], independent traffic generation per cell. Same arriving rate for all the cells; $\lambda_{DL} = \lambda_{UL} = 2$. File size = 0.5M |
| Scheduler | Proportional Fairness |
| Transmit power of Pico eNB | 24 dBm |
| Outdoor Pico antenna pattern | 2D, Omni-directional |
| Link adaptation | MCS selection with 10% BLER |
| UE UL Power control | open-loop: alpha = 0.8, Po = −76 dBm |

Simulations are made to four solutions wherein solution 1 belongs to the prior art which does not use any power control; solutions 2 to 4 are those according to embodiments of the present invention. Specifically, in solution 2, two thresholds are used, which are N/2 and =2N/3 respectively, and the power at three different levels are zero power, half power and full power; in solution 3, one threshold is used, which is N/2, and power at different levels are half power and full power; in solution 4, one threshold is used, which is N⅔, and the power at different levels are zero power and full power.

The simulation results regarding the UL UE performance and DL UE performance are given in tables 2 and 3.

TABLE 2

| | UL UE Performance | | | | |
| --- | --- | --- | --- | --- | --- |
| | 5% (edge UEs) | 50% | 95% | Average SE | $S_{UL}$ |
| Solution 1 | 0.198 | 0.462 | 1.819 | 0.705 | 556.5 |
| Solution 2 | 0.226 (14.14%) | 0.512 (10.82%) | 2.181 (19.9%) | 0.826 (17.16%) | 537.2 |
| Solution 3 | 0.224 (13.13%) | 0.536 (16.02%) | 1.512 (−16.88%) | 0.724 (2.7%) | 542.6 |
| Solution 4 | 0.248 (25.25%) | 0.465 (0.65%) | 2.265 (24.52%) | 0.849 (20.43%) | 537.3 |

TABLE 3

| | DL UE Performance | | | | |
|---|---|---|---|---|---|
| | 5% (edge UEs) | 50% | 95% ( ) | AVE SE | $S_{DL}$ |
| Solution 1 | 0.202 | 1.329 | 10.387 | 3.109 | 367.6 |
| Solution 2 | 0.275 (36.14%) | 1.643 (23.63%) | 8.218 (−20.88%) | 2.882 (−7.3%) | 345.1 |
| Solution 3 | 0.270 (33.66%) | 1.905 (43.34%) | 8.655 (−16.67%) | 3.120 (0.4%) | 340.1 |
| Solution 4 | 0.280 (38.61%) | 1.991 (49.81%) | 10.695 (2.97%) | 3.707 (19.23%) | 327.1 |

From the above simulation results, it can be seen that, with the solutions as provided in the present invention, both UL performance and DL performance for the edge UEs can be improved greatly (see "5% (edge UEs)") and the energy consumption for the uplink and downlink (see $S_{UL}$ and $S_{DL}$) can also be improved.

By far, the present invention has been described with reference to the accompanying drawings through particular preferred embodiments. However, it should be noted that the present invention is not limited to the illustrated and provided particular embodiments, but various modification may be made within the scope of the present invention.

Further, the embodiments of the present invention can be implemented in software, hardware or the combination thereof. The hardware part can be implemented by a special logic; the software part can be stored in a memory and executed by a proper instruction execution system such as a microprocessor or a dedicated designed hardware. Those normally skilled in the art may appreciate that the above method and system can be implemented with a computer-executable instructions and/or control codes contained in the processor, for example, such codes provided on a bearer medium such as a magnetic disk, CD, or DVD-ROM, or a programmable memory such as a read-only memory (firmware) or a data bearer such as an optical or electronic signal bearer. The apparatus and its components in the present embodiments may be implemented by hardware circuitry, for example a very large scale integrated circuit or gate array, a semiconductor such as logical chip or transistor, or a programmable hardware device such as a field-programmable gate array, or a programmable logical device, or implemented by software executed by various kinds of processors, or implemented by combination of the above hardware circuitry and software, for example by firmware.

Though the present invention has been described with reference to the currently considered embodiments, it should be appreciated that the present invention is not limited the disclosed embodiments. On the contrary, the present invention is intended to cover various modifications and equivalent arrangements falling within in the spirit and scope of the appended claims. The scope of the appended claims is accorded with the broadest explanations and covers all such modifications and equivalent structures and functions.

What is claimed is:

1. A method for determining transmission power for a base station, comprising:
   receiving information on link resource configuration of at least one interfered base station; and
   determining the transmission power for the base station, based on link resource configuration for the base station and the information on link resource configuration of the at least one interfered base station,
   wherein the link resource configuration comprises a plurality of subframes, each of the subframes used for downlink, uplink or special subframe, and
   wherein the information on the link resource configuration is a bitmap that represents the link resource configuration.

2. The method according to claim 1, wherein the information on link resource configuration is related to at least part of the subframes in a TDD radio frame, which is used for uplink transmission or downlink transmission in different link resource configurations.

3. The method according to claim 1, wherein the information on link resource configuration further comprises uplink resource utilization condition of the at least interfered base station.

4. The method according to claim 1, wherein the information on link resource configuration is indicated by the bit map representing the link resource configuration of the at least one interfered base station.

5. The method according to claim 1, wherein the determining the transmission power for the base station comprises
   determining, from the information on link resource configuration, an adjustment indicator reflecting a possibly caused interference condition under the link resource configuration; and
   setting the transmission power for the base station based on the adjustment indicator.

6. The method according to claim 5, wherein the adjustment indicator is related to the number of respective subframes in link resource configuration of the at least one interfered base station which are used by the at least one interfered base station for uplink transmission but, in the link resource configuration for the base station, are used for downlink transmission.

7. The method according to claim 5, wherein the setting the transmission power for the base station based on the adjustment indicator comprises
   setting the transmission power as a value corresponding to a range to which the adjustment indicator belongs.

8. The method according to claim 1, wherein the determining the transmission power for the base station is re-performed in response to reception of a power redetermination request comprising information on new uplink resource utilization condition of the at least interfered base station.

9. A method for providing, at a base station, information for transmission power determination, comprising
   obtaining information on link resource configuration of the base station; and
   transmitting the information on link resource configuration to at least one interfering base station for using in transmission power determination,
   wherein the link resource configuration comprises a plurality of subframes, each of the subframes used for downlink, uplink or special subframe, and
   wherein the information on the link resource configuration is a bitmap that represents the link resource configuration.

10. The method according to claim 9, wherein the information on link resource configuration is related to at least part of the subframes in a TDD radio frame which is used for uplink transmission or downlink transmission in different link resource configurations.

11. The method according to claim 9, wherein the information on link resource configuration further comprises link resource utilization condition of the base station.

12. The method according to claim 9, further comprising:
   transmitting to the interfering base station a power redetermination request comprising information on new uplink resource utilization condition of the base station.

13. An apparatus for determining transmission power for a base station, comprising:
   a configuration information receiving module configured to receive information on link resource configuration of at least one interfered base station; and
   a transmission power determination model configured to determine the transmission power for the base station, based on link resource configuration for the base station and the information on link resource configuration of the at least one interfered base station,
   wherein the link resource configuration comprises a plurality of subframes, each of the subframes used for downlink, uplink or special subframe, and
   wherein the information on the link resource configuration is a bitmap that represents the link resource configuration.

14. The apparatus according to claim 13, wherein the information on link resource configuration is related to at least part of the subframes in a TDD radio frame which can be used for uplink transmission or downlink transmission in different link resource configurations.

15. The apparatus according to claim 13, wherein the information on link resource configuration further comprises uplink resource utilization condition of the at least interfered base station.

16. The apparatus according to claim 13, wherein the information on link resource configuration is indicated by the bit map representing the link resource configuration of the at least one interfered base station.

17. The apparatus according to claim 13, wherein the transmission power determination model further comprises:
   an adjustment indicator determination module configured to determine, from the information on link resource configuration, an adjustment indicator reflecting a possibly caused interference condition under the link resource configuration; and
   a transmission power setting module configured to set the transmission power for the base station based on the adjustment indicator.

18. The apparatus according to claim 17, wherein the adjustment indicator is related to the number of respective subframes in link resource configuration of the at least one interfered base station which are used by the at least one interfered base station for uplink transmission but, in the link resource configuration for the base station, are used for downlink transmission.

19. The apparatus according to claim 17, wherein the transmission power setting module is further configured to
   set the transmission power as a value corresponding to a range to which the adjustment indicator belongs.

20. The apparatus according to claim 13, wherein the transmission power determination mode is configured to re-determine the transmission power in response to reception of a power redetermination request comprising information on new uplink resource utilization condition of the at least interfered base station.

21. An apparatus for providing, at a base station, information for transmission power determination, comprising
   a configuration information obtainment module configured to obtain information on link resource configuration of the base station; and
   a configuration information transmission module configured to transmit the information on link resource configuration to at least one interfering base station for using in transmission power determination,
   wherein the link resource configuration comprises a plurality of subframes, each of the subframes used for downlink, uplink or special subframe, and
   wherein the information on the link resource configuration is a bitmap that represents the link resource configuration.

22. The apparatus according to claim 21, wherein the information on link resource configuration is related to at least part of the subframes in a TDD radio frame, which can be used for uplink transmission or downlink transmission in different link resource configurations.

23. The apparatus according to claim 21, wherein the information on link resource configuration further comprises link resource utilization condition of the base station.

24. The apparatus according to claim 21, further comprising:
   a redetermination request transmission module configured to transmit to the interfering base station a power redetermination request comprising information on new uplink resource utilization condition of the base station.

* * * * *